United States Patent [19]

Boersma

[11] 3,977,100

[45] Aug. 31, 1976

[54] HYDRAULIC CONTROL SYSTEM FOR ELEVATING SCRAPER

[75] Inventor: Richard F. Boersma, Springfield, Ill.

[73] Assignee: Fiat-Allis Construction Machinery, Inc., Deerfield, Ill.

[22] Filed: Sept. 22, 1975

[21] Appl. No.: 615,249

[52] U.S. Cl. .......... 37/8; 37/124; 91/412

[51] Int. Cl.² .......... B60P 1/36

[58] Field of Search .......... 37/8, 124, 126 R, 129; 60/52; 91/412

[56] References Cited

UNITED STATES PATENTS

| | | | |
|---|---|---|---|
| 3,296,716 | 1/1967 | Rezabek et al. | 37/8 |
| 3,304,633 | 2/1967 | Hein et al. | 37/129 |
| 3,321,094 | 5/1967 | Shore | 37/8 X |
| 3,346,972 | 10/1967 | Johnson | 37/8 |
| 3,386,344 | 6/1968 | Junck et al. | 37/8 X |
| 3,484,960 | 12/1969 | Kokaly et al. | 37/8 |
| 3,581,415 | 6/1971 | Campbell | 37/8 |
| 3,596,383 | 8/1971 | Bispo et al. | 37/8 |
| 3,653,132 | 4/1972 | Campbell et al. | 37/8 |
| 3,820,257 | 6/1974 | Junck et al. | 37/8 |
| R26,398 | 6/1968 | Hein | 37/8 |

*Primary Examiner*—E. H. Eickholt
*Attorney, Agent, or Firm*—Thomas F. Kirby; Robert A. Brown

[57] ABSTRACT

An elevating scraper comprises a bowl which can be hydraulically raised and lowered, a motor-driven elevator which can be hydraulically raised and lowered, an ejector hydraulically movable forwardly from an aft position to eject material from the bowl and a hydraulic control system for operating the aforesaid components. The hydraulic control system enables selective independent operation of each component and further operates so that: (1) if there is no material in the bowl, the ejector can be moved forward while the elevator is lowered; (2) if the material is in the bowl the elevator automatically raises as the ejector moves forward and will lower automatically as the ejector is retracted; (3) if the elevator is partially or fully raised, a decrease in resistance on the ejector as it moves forward against a load, does not permit the elevator to be lowered; (4) the elevator may raise as required if it encounters increased resistance during operation; and (5) the elevator can be selectively lowered while the ejector is in forward position. The hydraulic control system includes a plurality of engine-driven pumps for supplying fluid to operate the components; an independently operable control valve for each component; a pilot pressure responsive double check valve arrangement between the elevator lift and ejector circuits to effect automatic elevator lifting; and a pressure responsive valve to permit the elevator to raise in the event of excessive loads thereon.

14 Claims, 2 Drawing Figures

HYDRAULIC CONTROL SYSTEM FOR ELEVATING SCRAPER

BACKGROUND OF THE INVENTION

1. Field of Use

This invention relates generally to hydraulic control systems for elevating or self-loading scrapers and, particularly, to such systems for operating the bowl lift cylinders, the elevator lift cylinders and the ejector cylinders of such scrapers.

2. Description of the Prior Art

Some elevating scrapers employ a bowl open at its forward end, bowl lift cylinders for raising and lowering the front end of the bowl, a motor driven elevator at the open end of the bowl for loading the bowl, elevator lift cylinders for raising and lowering the elevator relative to the forward cutting edge of the bowl, and ejector for unloading the bowl by pushing material out through the open end of the bowl and ejector cylinders for moving the ejector between retracted (rearward) and eject (forward) position. In some such prior art elevating scrapers, uncoordinated operator use of the controls for the bowl, elevator and ejector can have undersirable results. For example, ejection of material by the ejector directly against an elevator in lowered position can result in damage to the elevator. Furthermore, lowering of the bowl to effect a deeper cut without raising the elevator above the cutting edge to compensate for the increased load of material can overload or also physically damage the elevator. The prior art discloses several hydraulic control systems for elevating scrapers aimed at overcoming these and other related problems and the following U.S. patents are exemplary: U.S. Pat. No. Re. 26,398; U.S. Pat. Nos. 3,653,132; 3,386,344; 3,296,716; 3,346,972; 3,484,960; 3,581,415; and 3,258,926.

SUMMARY OF THE PRESENT INVENTION

In accordance with the invention, there is provided an elevating scraper comprising a bowl, at least one bowl lift cylinder for raising and lowering the bowl, a motor-driven elevator for loading material into the bowl, at least one elevator lift cylinder for raising and lowering the elevator, an ejector for emptying material from the bowl, and at least one ejector cylinder for moving the ejector between its forward ejecting position and its rearward retracted position. A hydraulic control system is provided for the aforementioned cylinders and operates so that: (1) if during the unload cycle there is no material in the bowl, the ejector can be moved forward to the end of its travel while the elevator remains lowered; (2) if during the unload cycle there is material in the bowl, the additional resistance met by the ejector as it is moved forward causes the elevator to be raised automatically and to lower automatically as the ejector is retracted; (3) if during the unload cycle the elevator is partially raised, any decrease in resistance on the ejector does not permit the elevator to lower automatically; (4) if there is any obstruction met by the elevator, it may raise as required; (5) and the elevator can be selectively lowered while the ejector remains in forward position to enable cleaning of material from the face of the ejector. The hydraulic control system comprises a plurality of engine-driven pumps (one for the bowl lift, the elevator lift, and the ejector cylinder, and another one exclusively for the ejector cylinders); independently operable control valves for the bowl lift cylinder, the elevator lift cylinder, and the ejector cylinder; a double check valve arrangement between the elevator lift circuit and ejector circuit for effecting elevator lift cylinder operation in response to sensing of pressure conditions in the ejector circuit; and a pressure relief valve and a replenishing valve for permitting the elevator to raise when an obstruction is encountered and a heavy load is imposed thereon as during a deep cut, to increase clearance between the elevator and bowl cutting edge.

A hydraulic control system for an elevating scraper in accordance with the invention offers numerous advantages over piror art arrangements. For example, raising and control of the elevator during material ejection is automatic and sequential, being controlled by and responsive to pressure conditions in the ejector circuit. Furthermore, the elevator is permitted to raise automatically as the depth of scraper cut is increased. In both instances, possible damage of the elevator is reduced and machine operation is safer and simpler. However, provision is made for operator override of automatic function, if conditions warrant. A scraper system in accordance with the invention employs, for the most part, conventional components and is relatively economical to produce. Other objects and advantages will hereinafter appear.

THE DRAWINGS

FIG. 1 is a side elevation of a self-loading elevating scraper in accordance with the invention showing the bowl thereof raised, the ejector blade retracted, and the elevator raised; and FIG. 2 is a schematic diagram of a hydraulic control system in accordance with the invention for the scraper shown in FIG. 1.

DESCRIPTION OF A PREFERRED EMBODIMENT

Figure 1:
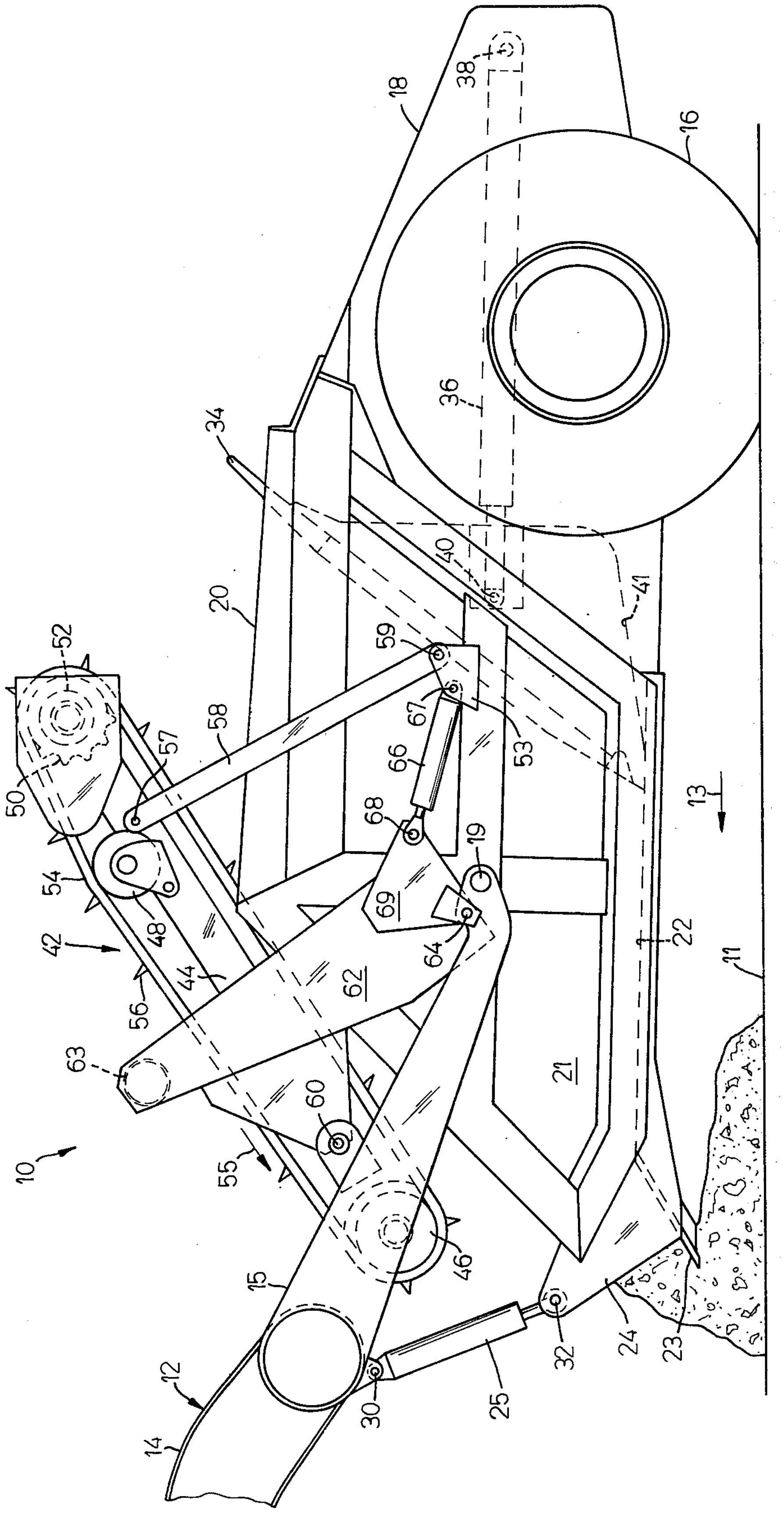

Referring to FIG. 1, the numeral 10 generally designates an elevating scraper in accordance with the invention which is understood to be capable of being drawn across the terrain 11 in the direction of arrow 13 by a tractor unit (not shown) so as to scrape up material from or on the terrain for transport and unloading elsewhere. Scraper 10 comprises a draft frame 12 having a gooseneck 14 at its forward end which adapts it for connection to the tractor unit, a pair of draft arms 15 (only one of which is shown) rearwardly extending from the gooseneck and a pair of groundengaging wheels 16 (only one of which is shown) at its rear end which are rotatably supported on the rear frame 18.

Scraper 10 further comprises a bowl 20 disposed between the draft arms 15 and pivotally connected thereto by trunnions 19. Bowl 20, which is open at its front end to receive and discharge material, has a floor 22 which is provided at its forward end with teeth such as 23, which define a cutting edge. The forward edges of the lateral sides 21 of bowl 20 are provided with side bits such as 24. An extendable and retractable hydraulic bowl cylinder 25 (only one of which is shown) is connected between each draft arm 15 and an associatd side bit 24 as by pins 30 and 32 and operates, when extended, to pivot bowl 20 about the trunnions 19, to lower the cutting edge of the bowl and, when retracted, to raise the cutting edge of the bowl. Bowl 20 is shown in FIG. 1 in fully raised position and bowl cylinder 25 is shown in fully retracted position.

An ejector 34 is mounted within bowl 20 and is adapted for sliding movement in the forward direction to eject material from the bowl and in the rearward direction by means of an extendable and retractable hydraulic ejector cylinder 36. The rear end of cylinder 36 is connected as by a pin 38 to rear frame 18 and the forward rod end of cylinder 36 is connected as by pin 40 to support plate means 41 rigidly connected to the rear of ejector 34. Ejector 34 is shown in FIG. 1 in fully rearward or retracted position and ejector cylinder 36 is shown in fully retracted position.

Scraper 10 also comprises an elevator 42 operable to assist in loading material into bowl 20. Elevator 42 comprises an elevator frame 44, a pair of laterally spaced apart lower idlers 46 (only one of which is shown), a pair of laterally spaced-apart intermediate idlers 48 (only one of which is shown), and a pair of laterally spaced-apart chain sprockets 50 (only one of which is shown), which sprockets are driven by a reversible hydrostatic drive such as hydraulic motor 52. Elevator 42 also comprises a pair of endless chains 54 (only one of which is shown), each of which is disposed around an idler 46, an idler 48 and a sprocket 50. Spaced-apart flights 56 are connected between the chains 54. The chains 54 and flights 56 are driven by motor 52 in the direction of an arrow 55 to load material into bowl 20 of scraper 10 but can operate in the reverse direction to assist in unloading or to scrape any material adhering to the face of ejector 34 after the ejector has reached the end of an ejecting stroke.

Elevator 42 is mounted with respect to bowl 20 by such means and in such manner that it can be moved between a fully lowered position and the fully raised position (in which it is shown in FIG. 1) or to any position therebetween. Elevator 42 is lowered during a loading operation so that its flights 56 can lift material into bowl 20. Elevator 42 is raised during a material ejecting operation to allow clearance for material being ejected. Elevator 42 can be lowered when ejector 34 is full forward to clean the face thereof and can be raised to a desired height during a loading operation to accommodate the size of cut. Thus, the upper end of elevator 42 is supported by a pair of upper links 58 (only one of which is shown), each of which is connected by a pin 57 to frame 44 and by a pin 59 to a plate 53 rigidly secured to the side 21 of bowl 20. The lower end of elevator 42 is supported by a pair of arms 62 (only one of which is shown) and are joined by torsion member 63. Each arm 62 is connected by a pin 60 to frame 44 and by a pin 64 to the rear end of an associated draft arm 15. A pair of extendable and retractable hydraulic elevator lift cylinders 66 (only one of which is shown in FIG. 1) are provided to raise and lower the elevator 42. Each elevator lift cylinder 66 is connected to the plate 53 on the side of bowl 20 by a pin 67 and to a point on a plate 69 rigidly secured to the bottom end of arm 62 by a pin 68. When the elevator lift cylinders 66 are fully retracted (as shown in FIG. 1), the elevator 42 is fully raised (as shown in FIG. 1) to afford clearance for material carried by ejector 34 as the latter moves forward to empty material from bowl 20. When the cylinders 66 are partly or fully extended, the arms 62 pivot (counterclockwise with respect to FIG. 1) to move elevator 42 to its partly or fully lowered position, respectively, wherein it is in a position to operate to load bowl 20. In fully lowered position it can also be employed to clean the face of ejector 34.

Figure 2:
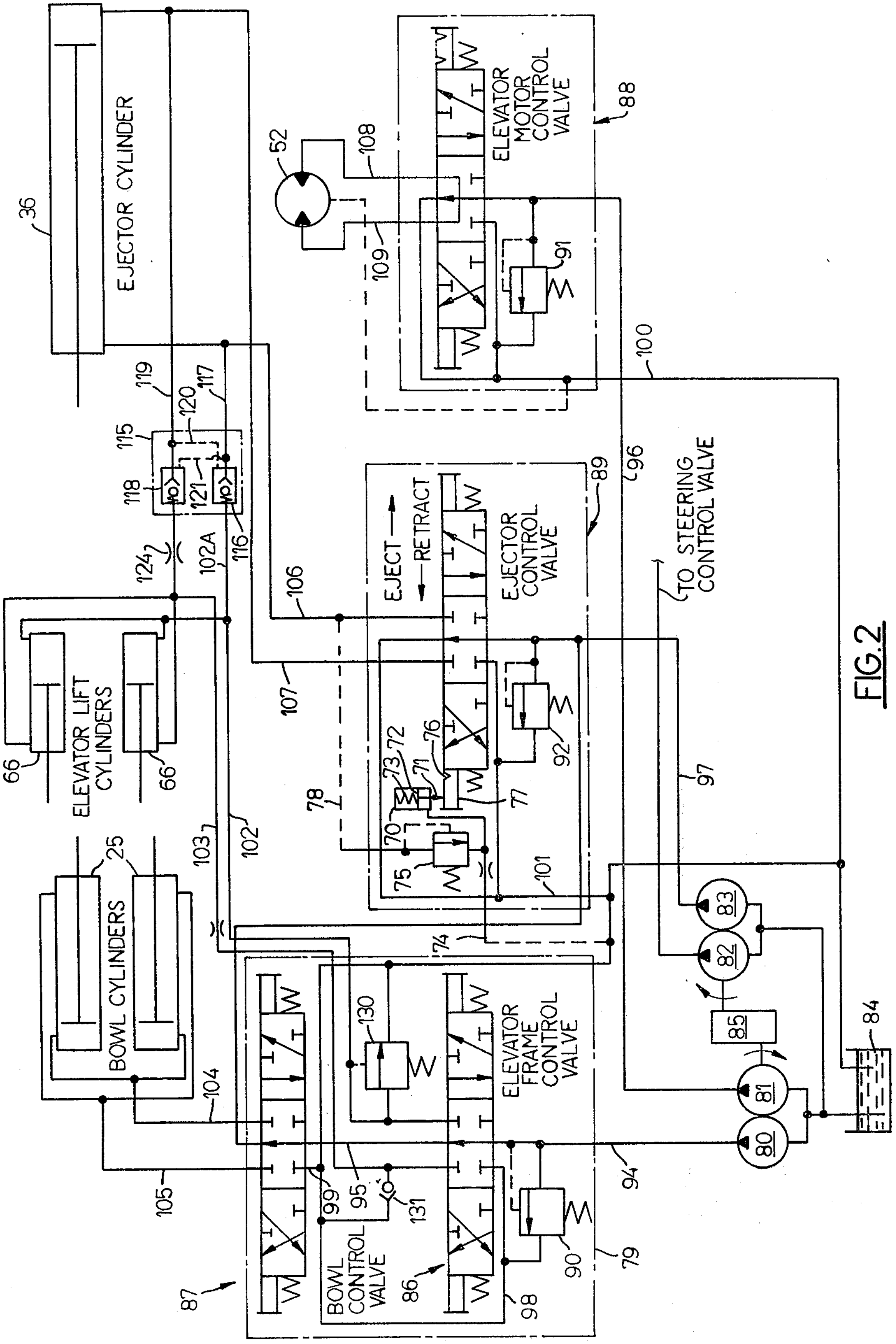

FIG. 2 shows a hydraulic control system in accordance with the invention for the elevating scraper 10 shown in FIG. 1. The control system comprises four hydraulic pumps 80, 81, 82 and 83 which are supplied with hydraulic fluid from a reservoir 84 and driven by an internal combustion engine 85. The pumps, reservoir and engine are understood to be mounted, for example, on the tractor unit (not shown) which pulls the scraper 10.

Pump 80 supplies operating fluid to the bowl lift cylinders 25 through an elevator frame control valve 86 and a bowl control valve 87; to the elevator lift cylinder 66 through the elevator frame control valve 86 and, under certain conditions, to the ejector cylinder 36 as hereinafter described. Pump 81 supplies operating fluid through an elevator motor control valve 88 to the reversible hydraulic elevator drive motor 52. Pump 82 supplies operating fluid to a steering control valve (not shown) for the tractor unit (not shown.) Pump 83 supplies operating fluid through an ejector control valve 89 to the ejector cylinder 36.

The valves 86, 87, 88 and 89 are each manually operable, three-position (neutral, raise, lower), infinitely variable, spring centered hydraulic control valves of known type. If preferred, the valves 86 and 87 may be combined in a common housing or structure as indicated by numeral 79. The pumps 80, 81 and 83 are protected by conventional pressure relief valves 90, 91 and 92, that are associated with valve housing 79 and valves 88 and 89, respectively.

Valve 86 is connected to pump 80 by a fluid supply line 94. Valve 87 is connected to pump 80 through valve 86 by a fluid supply line 95. Valve 88 is connected to pump 81 by a fluid supply line 96. Valve 89 is connected to pump 83 by fluid supply line 97. The valves 86, 87, 88 and 89 are connected to reservoir 84 by fluid return lines 98, 99, 100 and 101, respectively. Elevator frame control valve 86 is connected to the elevator lift cylinder 66 by a pair of fluid lines 102 and 103. Bowl control valve 87 is connected to the bowl cylinders 25 by a pair of fluid lines 104 and 105. Ejector control valve 89 is connected to the ejector cylinder 36 by a pair of fluid lines 106 and 107. Elevator motor control valve 88 is connected to elevator drive motor 52 by a pair of fluid lines 108 and 109.

A pilot controlled double check valve 115 is connected between the ejector cylinder 36 and the elevator lift cylinder 66. More specifically, valve 115 comprises a spring biased normally closed pilot operated check valve 116, poled as shown in FIG. 2, connected in a line 117 between fluid line 106 for ejector cylinder 36 and fluid line 102 for the elevator lift cylinders 66. Valve 115 further comprises a spring biased normally closed pilot operated check valve 118, poled as shown in FIG. 2, connected in a line 119 between fluid 107 for ejector cylinder 36 and fluid line 103 for the elevator lift cylinders 66. Check valve 116 is connected by a pilot line 120 to line 119 and opens in response to pressure build-up in the latter. Check valve 118 is connected by a pilot line 121 to line 117 and opens in response to pressure build-up in the latter. A flow regulator device 124 is provided in line 119 to limit fluid flow to the rod ends of the elevator lift cylinders 66 when the check valve 118 is open thereby controlling the speed of elevator raising or lowering.

The ejector control valve 89 is provided with means for maintaining it in ejector retract position until the ejector 34 is moved fully rightward with respect to FIG. 1, thereby relieving the machine operator from the need to hold the valve in such position. Such means comprise a spring-applied fluid-released latch cylinder 70 having a detent 71 which is movable by a piston 72 in response to operation of a biasing spring 73 or in response to fluid supplied from a pressure responsive valve 75. Detent 71 of latch cylinder 70 is engageable with a notch 76 in the left side actuator 77 of ejector control valve 89. Pressure responsive valve 75 has its inlet and outlet ports connecting in a fluid line 78 which is connected between fluid lines 106 and 98. The outlet port of valve 75 is also connected by a line 74 to latch cylinder 70. When ejector control valve 89 is moved full left, the detent 71 of latch 70 spring engages notch 76 in valve 89 and holds the ejector control valve 89 in retract position. When the piston of ejector cylinder 36 moves to fully retracted position, the pressure build-up in lines 106 and 78 causes pressure responsive valve 75 to open and supply fluid to latching cylinder 70 thereby retracting the detent 71 and permitting ejector control 89 to return to neutral.

A pilot operated spring biased normally closed cross relief valve 130 is connected between fluid line 102 for the elevator lift cylinders 66 and fluid return line 98 from elevator lift control valve 86. A replenishing check valve 131 is located between fluid lines 103 and 98 so that fluid when expelled from the right chambers of elevator lift cylinders 66 is replenished in the left chambers. Cross relief valve 130 and replenishing check valve 131, therefore, cooperate to permit the elevator 42 to raise in response to excessive load when hitting an obstacle, and also allows a gradual elevator raise during loading in deep cut or excessively hard material to increase the clearance between the cutting edge teeth 23 and the elevator flights 56.

The elevating scraper 10 and the control system therefore operate in the following manner. Assume initially, as shown in FIG. 2, that the engine 85 is running and that all pumps 80, 81, 82 and 83 are in operation. Also assume that the valves 86, 87, 88 and 89 are in neutral and that the relief valves 90, 91, 92 and 130 are closed. Further assume, as shown in FIGS. 1 and 2 that the bowl 20 is fully raised and that its lift cylinders 25 are fully retracted; that the elevator 42 is partially raised and that its cylinder 66 are partially extended; that the ejector 34 is fully retracted and that its cylinder 36 is fully retracted; and that the elevator drive motor 52 is stopped.

Under the foregoing assumptions, each control valve 86, 87, 88 or 89 is independently operable manually in either direction to carry out its respective function. It will be noted, however, that bowl control valve 87 cannot be employed to operate the bowl cylinder 25 to raise or lower the bowl when the elevator frame control valve 86 is moved from neutral to either elevator raise or lower position because supply line 95 is then cut off and fluid from pump 80 is diverted to operate the elevator lift cylinders 66 to raise and lower the elevator 42.

Assuming now that bowl 20 is filled with material and that a material unload cycle is to be carried out, ejector control valve 89 is moved (rightward from the position shown in FIG. 2) so as to supply fluid from pump 83 to ejector cylinder 36 to cause it to extend and thereby move ejector 34 forward (leftward with respect to FIG. 1).

During the material unload cycle, the increased pressure in the ejector forward line 107 due to the material resistance in the bowl 20, causes increased pressure in line 119 to effect the opening of the check valve 118 allowing some hydraulic oil flow from line 107, through line 119 into the elevator lift line 103. Fluid pressure in line 119 and in pilot line 120 effects opening of check value 116 thereby allowing fluid flow from the cylinder 66, through line 102A and through check valve 116 to line 117 and from thence to line 106 and through line 101 to reservoir 84. This effects raising of the elevator 42 as the ejector 34 travels forward. At any time the ejector control valve 89 is deactivated (i.e., in neutral), the raising of elevator 42 is checked and retained in its position at any level up to fully raised position. Such checking occurs because the check values 116 and 118 close and the elevator frame control valve 86, when in neutral, prevents fluid flow from the elevator lift cylinder 66 to the reservoir. Operator raising or lowering of the elevator 42 is still possible, however, through use of the elevator frame control valve 86 which then allows fluid flow to and from the elevator lift cylinder 66. The speed of raise and lowering of the elevator 42 is controlled by the flow regulating restrictor orifice 124 located in the fluid line of the elevator lift cylinders 66.

A feature of the invention which is apparent from FIG. 2 of the drawing pertains to the automatic lowering of the elevator 42 upon return and retraction of the ejector 34 and cylinder 36, respectively. This function is provided by the double pilot operated check valve 115 which comprises valves 116 and 118. At a predetermined fluid pressure buildup in line 117, pilot fluid pressure in line 121 will open pilot check valve 118 and permit fluid from the elevator raise side of the elevator lift cylinders 66 to return to reservoir 84 through lines 119, 107, valve 89 and line 101. The predetermined pressure necessary to open pilot check valve 118 is lower than the pressure required to operate the detent 71 of latch cylinder 70.

The concept of utilizing the double pilot operated check valve 115 in both fluid pressure lines of the ejector cylinder and also in respective association with both fluid pressure lines of the elevator cylinders 66 results in a particularly valuable feature for the operator. It has been found in practice that the operator is seldom required to operate the elevator control valve 86 in view of the fact that the elevator 42 automatically raises when the ejector control valve 89 is positioned to eject material and the elevator 42 automatically lowers when the ejector control valve 89 is positioned for retraction of ejector cylinder 36. In addition, the elevator 42 is permitted to raise automatically if high loads are encountered or for an increase in depth of scraper cut.

I claim:

1. In an elevating scraper:

a bowl having an end at which material is loaded and unloaded;

an ejector in said bowl;

an elevator at said end of said bowl;

a source of hydraulic fluid;

a hydraulic ejector circuit including a first hydraulic actuator operable to move said ejector toward said end to unload material from said bowl and a first valve independently actuatable to supply fluid from said source to operate said first actuator;

a hydraulic elevator lift circuit including a second hydraulic actuator operable to raise and lower said elevator and a second valve actuatable independently of said first valve to supply fluid from said source to operate said second actuator; and pressure responsive valve means connected between said elevator lift circuit and said ejector circuit and responsive to a fluid pressure condition in said ejector circuit resulting from an increased load on said ejector when said first valve is actuated to move said ejector toward said bowl end and against material in said bowl while said second valve is not actuated to direct fluid from said source to said second actuator to raise said elevator.

2. An elevating scraper according to claim 1 wherein said pressure responsive valve means comprises a pair of pilot operated check valves.

3. A scraper according to claim 1 wherein said ejector circuit comprises first and second fluid lines for directing fluid between said first valve and said first hydraulic actuator to effect movement of said ejector toward and away from said bowl end, respectively;

wherein said elevator lift circuit comprises first and second fluid lines for directing fluid between said second valve and said second hydraulic actuator to effect lowering and raising of said elevator, respectively;

and wherein said pressure responsive valve means comprises a pair of normally closed pilot controlled check valves which open when pilot pressure is applied to the pilot ports thereof, one check valve being connected between said first fluid line of said ejector circuit and the second fluid line of said elevator lift circuit, the other check valve being connected between said second fluid line of said ejector circuit and the first fluid line of said elevator lift circuit, each check valve permitting fluid flow between said elevator lift circuit and said ejector circuit when open, the pilot port of said one check valve being connected to said second fluid line of said ejector circuit and the pilot port of said other check valve being connected to said first fluid line of said ejector circuit.

4. An elevating scraper according to claim 1 wherein said source of hydraulic fluid comprises a separate pump for said ejector circuit and said elevator lift circuit.

5. An elevating scraper according to claim 1 including latching means responsive to fluid pressure conditions in said ejector circuit for maintaining said first valve actuated until said ejector movement away from said end of said bowl stops and fluid pressure in said ejector circuit changes.

6. In an elevating scraper:

a bowl having an end at which material is loaded and unloaded;

an ejector in said bowl;

an elevator at said end of said bowl;

a source of hydraulic fluid;

a hydraulic ejector circuit including a first hydraulic actuator operable to move said ejector toward said end to unload material from said bowl and a first valve independently actuatable to supply fluid from said source to operate said first actuator;

a hydraulic elevator lift circuit including a second hydraulic actuator operable to raise and lower said elevator and a second valve actuatable independently of said first valve to supply fluid from said source to operate said second actuator;

first pressure responsive valve means connected between said elevator lift circuit and said ejector circuit and responsive to a fluid pressure condition in said ejector circuit resulting from an increased load on said ejector when said first valve is actuated to move said ejector toward said bowl end and against material in said bowl while said second valve is not actuated to direct fluid from said source to said second actuator to raise said elevator;

a hydraulic bowl lift circuit including a third hydraulic actuator operable to raise and lower said bowl and a third valve actuatable independently of said first and second valves to supply fluid from said source to operate said third actuator;

and second pressure responsive valve means connected to said elevator lift circuit and responsive to a fluid pressure condition therein while said second valve is not actuated and resulting from an increased load imposed on said elevator by material being loaded in said bowl to permit release of fluid in said second actuator to allow said elevator to raise.

7. An elevating scraper according to claim 6 including a hydraulic elevator drive circuit including a fourth hydraulic actuator operable to drive said elevator in forward or reverse directions and a fourth valve actuatable independently of said first, second, and third valves to supply fluid from said source to operate said fourth actuator.

8. In an elevating scraper:

a bowl having an end at which material is loaded and unloaded;

an ejector in said bowl;

an elevator at said end of said bowl;

a source of hydraulic fluid;

a hydraulic ejector circuit including a first hydraulic actuator operable to move said ejector toward said end to unload material from said bowl and to move said ejector in the opposite direction to retracted position and a first valve independently actuatable to supply fluid from said source to operate said first actuator;

a hydraulic elevator lift circuit including a second hydraulic actuator operable to raise and lower said elevator and a second valve actuatable independently of said first valve to supply fluid from said source to operate said second actuator; and pressure responsive valve means connected between said elevator lift circuit and said ejector circuit and responsive to a fluid pressure condition in said ejector circuit resulting from an increased load on said ejector when said first valve is actuated to move said ejector toward said bowl end and against material in said bowl while said second valve is not actuated to direct fluid from said source to said second actuator to raise said elevator, said pressure responsive valve means being further responsive to a fluid pressure condition in said ejector circuit resulting when said first valve is actuated to move said ejector to retracted position to permit fluid flow from said second hydraulic actuator while said second valve is not actuated to thereby cause said second hydraulic actuator to permit lowering of said elevator.

9. An elevating scraper according to claim 8 wherein said pressure responsive valve means comprises a pair of pilot operated check valves.

10. A scraper according to claim 9 wherein said ejector circuit comprises first and second fluid lines for directing fluid between said first valve and said first hydraulic actuator to effect movement of said ejector toward and away from said bowl end, respectively;

wherein said elevator lift circuit comprises first and second fluid lines for directing fluid between said second valve and said second hydraulic actuator to effect lowering and raising of said elevator, respectively;

and wherein said pressure responsive valve means comprises a pair of normally closed pilot controlled check valves which open when pilot pressure is applied to the pilot ports thereof, one check valve being connected between said first fluid line of said ejector circuit and the second fluid line of said elevator lift circuit, the other check valve being connected between said second fluid line of said ejector circuit and the first fluid line of said elevator lift circuit, each check valve permitting fluid flow between said elevator lift circuit and said ejector circuit when open, the pilot port of said one check valve being connected to said second fluid line of said ejector circuit and the pilot port of said other check valve being connected to said first fluid line of said ejector circuit, said one check valve being further operable to permit fluid flow from said elevator lift circuit when opened in response to a predetermined pressure build-up in said second fluid line in said ejector circuit.

11. An elevating scraper according to claim 8 wherein said source of hydraulic fluid comprises a separate pump for said ejector circuit and said elevator lift circuit.

12. An elevating scraper according to claim 8 including latching means responsive to fluid pressure conditions in said ejector circuit for maintaining said first valve actuated until said ejector movement away from said end of said bowl stops and fluid pressure in said ejector circuit changes.

13. In an elevating scraper:

a bowl having an end at which material is loaded and unloaded;

an ejector in said bowl;

an elevator at said end of said bowl;

a source of hydraulic fluid;

a hydraulic ejector circuit including a first hydraulic actuator operable to move said ejector toward said end to unload material from said bowl and to move said ejector in the opposite direction to retracted position and a first valve independently actuatable to supply fluid from said source to operate said first actuator;

a hydraulic elevator lift circuit including a second hydraulic actuator operable to raise and lower said elevator and a second valve actuatable independently of said first valve to supply fluid from said source to operate said second actuator;

first pressure responsive valve means connected between said elevator lift circuit and said ejector circuit and responsive to a fluid pressure condition in said ejector circuit resulting from an increased load on said ejector when said first valve is actuated to move said ejector toward said bowl end and against material in said bowl while said second valve is not actuated to direct fluid from said source to said second actuator to raise said elevator, said pressure responsive valve means being further responsive to a fluid pressure condition in said ejector circuit resulting when said first valve is actuated to move said ejector to retracted position to permit fluid flow from said second hydraulic actuator while said second valve is not actuated to thereby cause said second hydraulic actuator to permit lowering of said elevator;

a hydraulic bowl lift circuit including a third hydraulic actuator operable to raise and lower said bowl and a third valve actuatable independently of said first and second valves to supply fluid from said source to operate said third actuator;

and second pressure responsive valve means connected to said elevator lift circuit and responsive to a fluid pressure condition therein while said second valve is not actuated and resulting from an increased load imposed on said elevator by material being loaded in said bowl to permit release of fluid in said second actuator to allow said elevator to raise.

14. An elevating scraper according to claim 13 including a hydraulic elevator drive circuit including a fourth hydraulic actuator operable to drive said elevator in forward or reverse directions and a fourth valve actuatable independently of said first, second, and third valves to supply fluid from said source to operate said fourth actuator.

* * * * *